(12) United States Patent
Hu et al.

(10) Patent No.: US 7,730,236 B2
(45) Date of Patent: *Jun. 1, 2010

(54) CELLULAR PHONE AND PORTABLE STORAGE DEVICE USING THE SAME

(75) Inventors: Shih-Chang Hu, Hsin-Chu (TW); Chia Jung Chen, Tainan (TW)

(73) Assignee: Mediatek Inc., Hsin-Chu (TW)

( * ) Notice: Subject to any disclaimer, the term of this patent is extended or adjusted under 35 U.S.C. 154(b) by 353 days.

This patent is subject to a terminal disclaimer.

(21) Appl. No.: 11/242,420

(22) Filed: Sep. 30, 2005

(65) Prior Publication Data

US 2007/0079019 A1      Apr. 5, 2007

(51) Int. Cl.
*G06F 12/00* (2006.01)

(52) U.S. Cl. ............... 710/37; 710/8; 710/2; 710/17

(58) Field of Classification Search ............ 710/8, 710/36, 62, 15, 33; 327/334; 709/231; 455/410, 455/466, 557, 558

See application file for complete search history.

(56) References Cited

U.S. PATENT DOCUMENTS

| | | | |
|---|---|---|---|
| 7,054,622 B2 * | 5/2006 | Wang | 455/418 |
| 7,433,712 B2 * | 10/2008 | Moran et al. | 455/557 |
| 7,496,377 B2 * | 2/2009 | Kwon | 455/550.1 |
| 7,644,406 B2 * | 1/2010 | Gustafson et al. | 717/172 |
| 2003/0038791 A1 * | 2/2003 | Chou | 345/204 |
| 2003/0073412 A1 * | 4/2003 | Meade, II | 455/70 |
| 2003/0163656 A1 * | 8/2003 | Ganton | 711/154 |
| 2003/0182414 A1 * | 9/2003 | O'Neill | 709/223 |
| 2004/0039575 A1 * | 2/2004 | Bum | 704/500 |
| 2004/0104757 A1 * | 6/2004 | Vargas | 327/334 |
| 2004/0157638 A1 | 8/2004 | Moran et al. | |
| 2005/0101342 A1 * | 5/2005 | Chuang | 455/550.1 |
| 2005/0213399 A1 * | 9/2005 | Hoover et al. | 365/191 |

(Continued)

FOREIGN PATENT DOCUMENTS

JP      2002359694      12/2002

(Continued)

OTHER PUBLICATIONS

Nokia 3650 User's Guide, Nokia, 2003, pp. 1-157.*

(Continued)

*Primary Examiner*—Henry W. H. Tsai
*Assistant Examiner*—Cheng-Yuan Tseng
(74) *Attorney, Agent, or Firm*—Thomas, Kayden, Horstemeyer & Risley (57) ABSTRACT

A cellular phone. The cellular phone comprises a connector, a first memory module, a second memory module, and a controller. The connector is used for physically connecting the cellular phone to an external device. The first memory module stores phone data. The second memory module stores application data received from the external device. The controller determines whether the connector is connected to the external device. If the connector is not connected to the external device, access right of both the first and second memory modules is granted exclusively to the cellular phone. If the connector is connected to the external device, access right of the first memory is granted exclusively to the cellular phone, and access right of the second memory module is granted exclusively to the external device.

32 Claims, 5 Drawing Sheets

U.S. PATENT DOCUMENTS

| | | |
|---|---|---|
| 2005/0228980 A1* | 10/2005 | Brokish et al. ............... 713/2 |
| 2005/0246396 A1* | 11/2005 | Oreizy et al. ............... 707/204 |
| 2006/0143339 A1* | 6/2006 | Chang et al. ............... 710/62 |
| 2006/0293083 A1* | 12/2006 | Bowen ............... 455/558 |
| 2007/0038785 A1* | 2/2007 | Varanda et al. ............... 710/62 |
| 2007/0038941 A1* | 2/2007 | Wysocki et al. ............... 715/748 |
| 2007/0047369 A1* | 3/2007 | Murakami et al. ..... 365/230.03 |
| 2007/0047373 A1* | 3/2007 | Niimi ............... 365/230.06 |
| 2007/0047782 A1* | 3/2007 | Hull et al. ............... 382/124 |
| 2007/0053335 A1* | 3/2007 | Onyon et al. ............... 370/338 |

FOREIGN PATENT DOCUMENTS

| | | |
|---|---|---|
| TW | 256230 BB * | 11/2003 |
| TW | 570237 | 1/2004 |
| TW | 1224919 | 12/2004 |
| WO | WO0149019 | 7/2001 |

OTHER PUBLICATIONS iPod User's Guide, Apple Computer, 2002, pp. 1-38.*
Nokia, Nokia 3650 User Guide, 2002, Nokia, pp. 1-206.*
Tanenbaum, Modern Operating Systems, 2001, Prentice Hall, pp. 20, 516-519.*
DE Office Action mailed Jul. 8, 2008.
English abstract of TW570237, pub. Jan. 1, 2004.
English abstract of TW 1224919, pub. Dec. 1, 2004.

* cited by examiner

CELLULAR PHONE AND PORTABLE STORAGE DEVICE USING THE SAME

BACKGROUND

The invention relates to a cellular phone and in particular to a cellular phone that can be utilized as an external storage device for an external electronic apparatus.

Cellular phones are widely used, and their functionality has increased dramatically in recent years. Advances in semiconductor technology have enabled cellular phones to perform a wide variety of tasks, facilitating daily activities. Cellular phones, for example, can be used to place calls, take photographs, access the Internet, send and receive email, check stock quotes and sports scores, and operate as a personal digital assistant (or PDA) and MP3 player.

Data required for performing the described tasks is difficult to input manually via a keyboard, and is generally downloaded through a telephone network or via a wireless connection. Downloading through a telephone network is time consuming and requires a connection fee. A typical wireless connection, however, does not provide enough bandwidth to effectively download a large amount of data, such as a large image or video file.

Additionally, as cellular phone functionality increases, memory capacity therein increases accordingly, as does the amount of data required for performing the described tasks.

According to a conventional method, the memory of a cellular phone can be used as an external storage device for a computer. For a computer, in order to communicate with a cellular phone and utilize the memory therein as an external storage device, vendor-provided software must be pre-installed in the computer.

Figure 1:
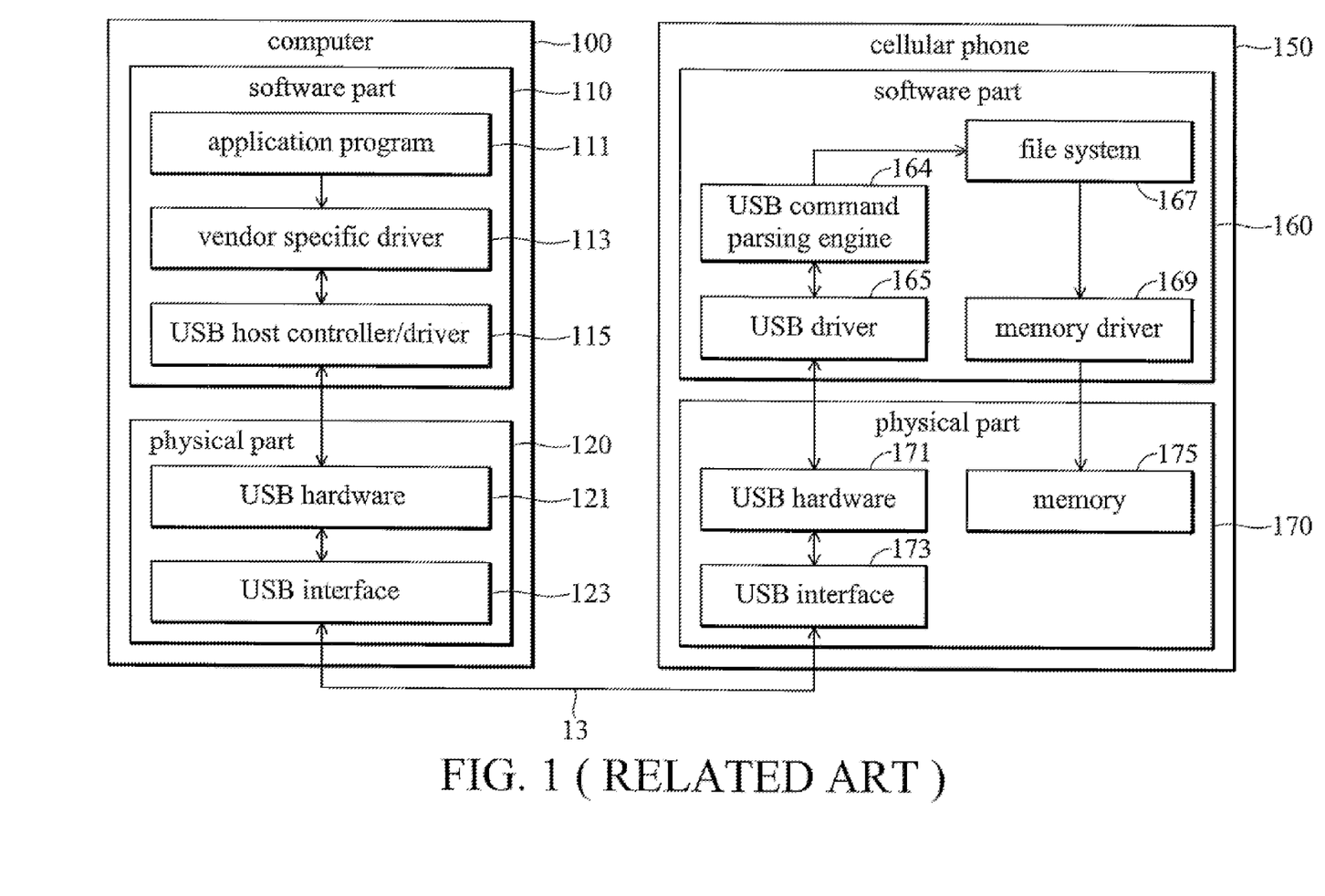
FIG. 1 is a schematic view of a conventional computer utilizing a cellular phone as an external storage device.

FIG. 1 is a schematic view of a conventional computer utilizing a cellular phone as an external storage device. A cellular phone 150 is connected to a computer 100 via a USB cable 13. Both computer 100 and cellular phone 150 comprise hardware and software components, wherein the computer 100 comprises a hardware component 120 and a software component 110, and the cellular phone 150 comprises a hardware component 170 and a software component 160. The software component 110 comprises an application program 111, a vendor specific driver 113, and a USB host controller/driver 115. Typically, the application program 111 and vendor specific driver 113 are provided by a cellular phone manufacturer, and installed in the computer 100 by a user. In order to communicate with an external device via the USB cable 13, the hardware component 120 comprises a USB hardware 121 and a USB interface 123. In order to receive and transmit data via the USB cable 13, the hardware component 170 comprises USB device 171 and a USB interface 173, and the software component 160 comprises a USB driver 165 and a USB command parsing engine 164. The USB command parsing engine 164 parses a command submitted via the vendor-provided application program 111 and/or the vendor specific driver 113, and data stored in a memory 175 is retrieved and/or stored accordingly. Utilization of the data stored in the memory 175 is accomplished through a file system 167 and a memory driver 169. For example, the memory 175 of the cellular phone 150 is a non-volatile memory, and the memory driver 169 is a Flash driver.

Here, the file system is a mechanism for storing and organizing files and the data they contain to make it easy to find and access them. File systems may use a storage device and involve maintaining the physical location of the files, or they may be virtual and exist only as an access method for virtual data or for data over a network (e.g. NFS). More formally, a file system is a set of abstract data types that are implemented for the storage, hierarchical organization, manipulation, navigation, access, and retrieval of data.

In order to use the memory 175 of the cellular phone 150 as an external storage of the computer 100, application program 111 and vendor specific driver 113 must be installed. A command is submitted via the application program 111 and the vendor specific driver 113 to transmit and store data from the memory 175 of the cellular phone 150. The command is transferred to the cellular phone 150 via the USB driver 115, USB hardware 121, USB interface 123, and the USB cable 13. The command is then received by the USB interface 173, and transferred to the USB command parsing engine 164 via the USB device 171 and USB driver 165. The command is parsed by the USB command parsing engine 164 and transmitted to the file system 167. The file system 167 retrieves data from and/or stores data in the memory 175 according to the parsed command. The file system 167 used for managing data transfer between the computer 100 and cellular phone 150 can be used for data management while an incoming call is received by the cellular phone 150.

In the conventional method, the installation of the application program 111 and the vendor specific driver 113 is required, otherwise various phone features cannot operate simultaneously when the cellular phone is used as a storage device for a computer, which is inconvenient and limits the usefulness of the phone.

SUMMARY

The invention provides a cellular phone. An exemplary embodiment of a cellular phone comprises a connector, a first memory module, a second memory module, and a controller. The connector is used for physically connecting the cellular phone to an external device. The first memory module stores phone data. The second memory module stores application data received from the external device. The controller determines whether the connector is connected to the external device. If the connector is not connected to the external device, access right of both the first and second memory modules is granted exclusively to the cellular phone. If the connector is connected to the external device, access right of the first memory is granted exclusively to the cellular phone, and access right of the second memory module is granted exclusively to the external device.

Also provided is a method of manipulating a cellular phone. The cellular phone comprises a connector, a first memory module, a second memory module, and a phone file system. The phone detect that the connector is connected to an external device when the external device has a device file system. When connected, the access right of the first memory is granted exclusively to the phone file system and access right of the second memory module exclusively to the external device.

DESCRIPTION OF THE DRAWINGS

The invention can be more fully understood by reading the subsequent detailed description and examples with references made to the accompanying drawings, wherein.

DETAILED DESCRIPTION

The invention will now be described with reference to FIGS. 2 through 4, which generally relate to cellular phone operation. While some embodiments of the invention are applicable to storage and utilization of a ring tone file, it is understood that other data files employed by a cellular phone may be implemented.

In the following detailed description, reference is made to the accompanying drawings which form a part hereof, and in which is shown by way of illustration of specific embodiments. These embodiments are described in sufficient detail to enable those skilled in the art to practice the invention, and it is to be understood that other embodiments may be utilized and that structural, logical and electrical changes may be made without departing from the spirit and scope of the present invention. The following detailed description is, therefore, not to be taken in a limiting sense. The leading digit(s) of reference numbers appearing in the figures corresponds to the Figure number, with the exception that the same reference number is used throughout to refer to an identical component which appears in multiple figures.

Figure 2:
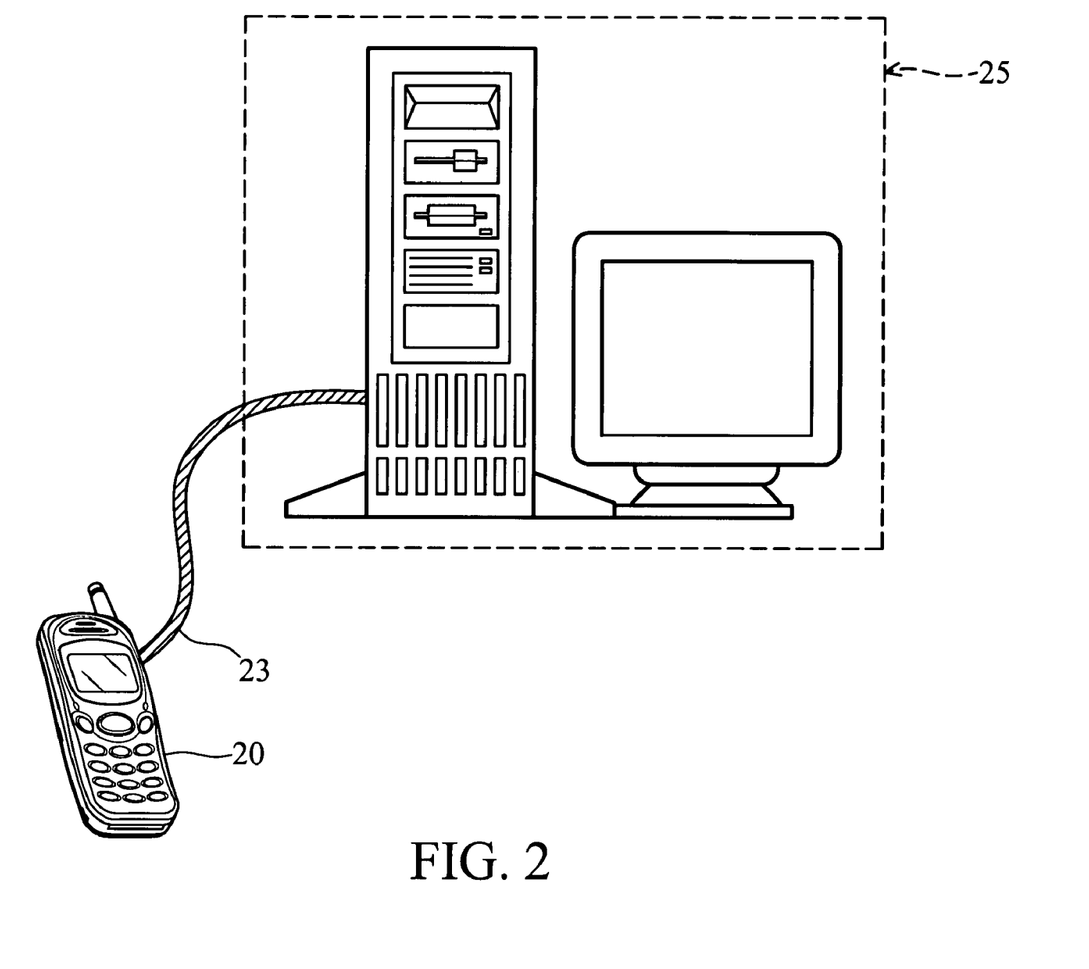
FIG. 2 is a schematic view of an embodiment of a cellular phone connected to a computer system of the invention.

FIG. 2 is a schematic view of an embodiment of a cellular phone connected to a computer system of the invention. A cellular phone 20 connects with a computer system 25 via a Universal Serial Bus (USB) cable 23. The cellular phone 20 can be connected to the computer system 25 via different connection standards. Here, the USB connection standard is an example for describing the present invention. Data originally stored in and/or generated by the computer system 25 may be transferred to the cellular phone 20 via the USB cable 23. The transferred data can be stored in an internal memory of the cellular phone 20 and be utilized thereby. The data can comprise, for example, image data, multimedia data, MP3 data, ring tone data, or other data that can be utilized during operation of the cellular phone.

Figure 3:
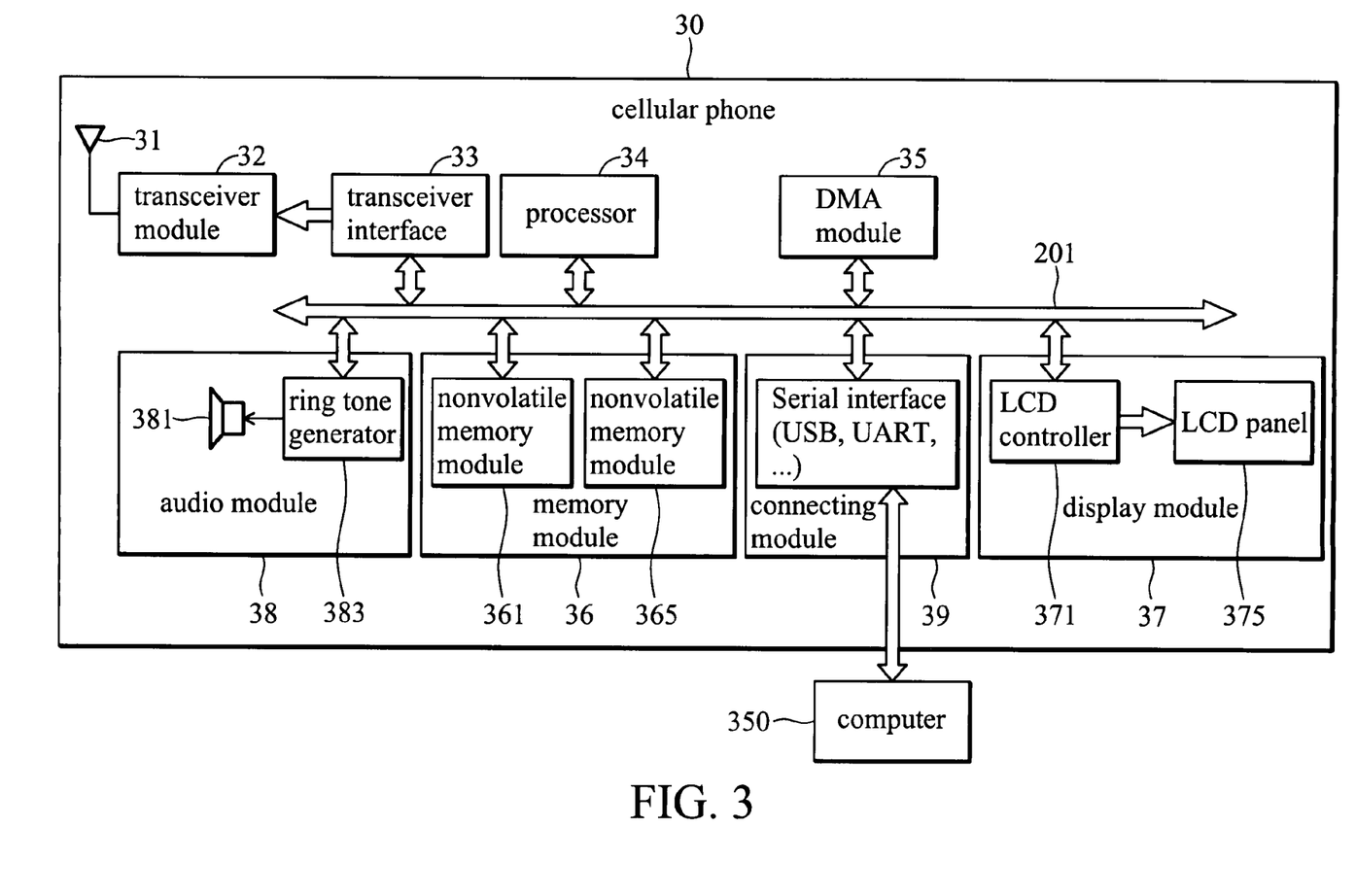
FIG. 3 shows a block diagram of an embodiment of a cellular phone.

FIG. 3 shows a block diagram of an embodiment of a cellular phone of the invention. A cellular phone 30, as shown in FIG. 3, includes an antenna 31, a transceiver module 32, a transceiver interface 33, a processor 34, a DMA module 35, a memory module 36, a display module 37, an audio module 38, and a connecting module 39. The audio module 38 comprises a speaker 381 and a ring tone generator 383. The cellular phone 30 connects to a computer 350 via the connecting module 39.

The display module 37, comprising a LCD controller 371 and an LCD panel 375, visually presents information to a user. An operating module (not shown), comprising a keyboard and/or a touch panel, can be used for inputting operational commands to the cellular phone.

The antenna 31 receives and transmits radio signals. The transceiver module 32, connecting to the antenna 31 and the transceiver interface 33, receives and transmits radio signals via the antenna 31.

The memory module 36 stores operating programs, ring tone files, phone numbers, and other data. The memory module 36 comprises nonvolatile memory modules 361 and 365. The nonvolatile memory module 361 stores codes for performing operations on the cellular phone 30 and phone data, wherein the phone data comprises data such as incoming-call information, phone book data, default ring tone data, and calibration data. The nonvolatile memory modules 365 stores application data, such as multi-media data, which may be music files (for example, MP3 files), video files (for example, MPEG 4 files), and image files (for example, JPEG files). The speaker 381 emits audio signals, alarm signals, and other audible signals. A microphone (not shown) is used for the receiving voice of the user.

The connecting module 39 connects the cellular phone 30 to another device, such as a computer system 350. The connecting module 39 can be designed to comply different connection standards for meeting requirements. Therefore, the connecting module 39 may be a USB (Universal Serial Bus) connecting module or a UART (Universal Asynchronous Receiver/Transmitter) connecting module.

The UART or universal asynchronous receiver-transmitter is a piece of hardware of an electronic apparatus, such as a computer, that takes bytes of data and transmits the data bits in a sequential way. The UART is usually an integrated circuit used for serial communications over a computer or peripheral device serial port.

The connecting module 39 may also be an IEEE 1394 connecting module. The IEEE 1394 (also known as I.LINK or FIREWIRE—I.LINK and FIREWIRE are trademarks) is a personal computer and digital video serial bus interface standard offering high-speed communications and isochronous real-time data services.

The connecting module 39 may also be a BLUETOOTH (BLUETOOTH is a trademark) connecting module. The BLUETOOTH is an industrial specification for wireless personal area networks (PANs). BLUETOOTH provides a way to connect and exchange information between devices like personal digital assistants (PDAs), mobile phones, laptops, POs, printers and digital cameras via a secure, low-cost, globally available short range radio frequency.

The connecting module 39 may also be an IrDA connecting module. IrDA refers to Infrared Data Association, a standard for communication between devices (such as computers, PDAs and mobile phones) over short distances using infrared signals.

The connecting module 39 may also be an NFC connecting module. Near Field Communication Technology or NFC jointly developed by SONY and PHILLIPS (SONY and PHILLIPS are trademarks) was approved as an ISO/IEC standard on Dec. 8, 2003. It was approved as an ECMA standard earlier on. Near Field Communication Technology holds the promise of bringing true mobility to consumer electronics in an intuitive and psychologically comfortable way since the devices can hand-shake only when brought literally into touching distance.

The connecting module 39 may also be a WIFI connecting module. Wi-Fi (sometimes written Wi-fi, WiFi, Wifi, wifi) is a trademark for set of product compatibility standards for wireless local area networks (WLANs). Wi-Fi, short for "Wireless Fidelity", was intended to allow mobile devices, such as laptop computers and personal digital assistants (PDAs) to connect to local area networks, but is now often used for Internet access and wireless VoIP phones. Wi-Fi is based on the IEEE 802.11 specifications.

The connecting module 39 may also be a ZigBee connecting module. ZigBee is a published specification set of high level communication protocols designed to use small, low power digital radios based on the IEEE 802.15.4 standard for wireless personal area networks (WPANs). The relationship between IEEE 802.15.4 and ZigBee is analogous to that existing between IEEE 802.11 and the Wi-Fi Alliance. The ZigBee 1.0 specifications were ratified on Dec. 14, 2004 and are available to members of the ZigBee Alliance.

A signal modulating/demodulating module (not shown) modulates signals to be sent and demodulates received signals. The processor 34 controls operations of the cellular phone according to programs stored in the memory module 36, and may be a central processing unit (CPU).

When an incoming call is received, the ring tone generator 383 generates a ring tone according to a preset ring tone file, and the speaker 381 emits the ring tone. When cellular phone 30 is not connected to computer device 350, the ring tone may be generated using a ring tone file stored in the nonvolatile memory module 361 or 365 based on a user setting. When cellular phone 30 is connected to computer 350 via connecting module 39, a ring tone is generated according to a default setting using a ring tone file stored in the nonvolatile memory module 361. Additionally, when cellular phone 30 is connected to computer 350 via connecting module 39, nonvolatile memory module 365 is accessible exclusively by the computer 350, and nonvolatile memory module 361 is accessible exclusively by cellular phone 30.

The nonvolatile memory modules 361 and 365 may employ different types of memory modules to meet requirements. For example, nonvolatile memory modules 361 and 365 may be two flash memories controlled by two distinct memory drivers. When computer 350 access nonvolatile memory modules 365 via connecting module 39, the file system of cellular phone 30 may access phone data stored in nonvolatile memory modules 361 at the same time. Because nonvolatile memory modules 361 and 365 are two separate flash memory modules controlled by distinct flash drivers, data accessing operations of nonvolatile memory modules 361 and 365 may be performed separately at a particular time. As mentioned, the nonvolatile memory module 361 stores phone data, while the nonvolatile memory module 365 stores application data. Therefore, the phone data and the application data are stored in different flash memory modules, and when the cellular phone 30 is connected to the computer 350, the cellular phone can access the phone data in the nonvolatile memory module 361 for performing phone-related functionality, such as receiving an incoming call and generating a ring tone via accessing a preset ring tone file in the module 361. At the same time, the computer can access the application data in the nonvolatile memory module 365 for storing/deleting multimedia data files in the module 365. Since the nonvolatile memory modules 361 and 365 are two separate flash memories, there are two distinct memory drivers for controlling them. The two memory drivers are shown in FIGS. 4A & 4B as the memory drivers 412 and 414, and the memory module 36 is implemented as two flash memories.

According to another embodiment, memory module 36 may be a flash memory module comprising more than two banks, for example, 4 banks. It can be designed that the first, second, and third banks of the 4 banks are to be the nonvolatile memory module 361 for storing codes and phone data, and the forth bank of the 4 banks is to be the nonvolatile memory module 365 for storing application data. In some embodiments, in the nonvolatile memory module 361, the first and second banks are used for storing the codes while the third bank is used for storing the phone data. When cellular phone 30 is connected to computer 350 via connecting module 39, computer 350 and cellular phone 30 are allowed to access different banks of the memory module 36. That is, the computer only can access the forth bank, i.e. the nonvolatile memory module 365, for application data, while the cellular phone 30 can only access the first, second, and third banks, i.e. the nonvolatile memory module 361, separately for codes and phone data. Since the nonvolatile memory modules 361 and 365 are in the same flash memory, there is only one memory driver for controlling that flash memory and the memory module 36 is implemented as one flash memory.

Due to the characteristics of flash memory, it is impossible to write data in or delete data from two banks within the same flash memory at the same time. Therefore, in some circumstances, when computer 350 requests to write data in nonvolatile memory modules 365 (a first write request) and the file system of cellular phone 30 requests to write data in nonvolatile memory modules 361 (a second write request) at the same time, the memory driver controlling the flash memory, i.e. the memory module 36, may suspend one of the write requests, for example, the first request, and grant the other request, the second request. The suspended request, the first request, is granted until the write session corresponding to the other write request (the second request) ends. Additionally, when the time period that the write request (the first request) is suspended exceeds a preset limit, an error signal may be emitted to notify the suspension.

In some embodiment, when the cellular phone 30 is powered on, the codes stored in the nonvolatile memory module 361 can be copied to a DRAM (Dynamic Random Access Memory) or a SRAM (Static Random Access Memory) for execution so as to increase the performance and simplifies the data access.

Operations to be performed when signals are received by the cellular phone are hereinafter described in detail by referring to FIG. 3.

When cellular phone 30 is not connected to computer 350, access rights of nonvolatile memory modules 361 and 365 are granted to a phone file system (not shown) in cellular phone 30.

When cellular phone 30 is connected to computer 350, access right of nonvolatile memory modules 365 is granted exclusively to a computer file system (not shown) in computer 350, while access right of nonvolatile memory module 361 is granted exclusively to the file system in cellular phone 30. In other words, phone file system accesses nonvolatile memory modules 361 and 365 when cellular phone 30 is not connected to the computer 350, accesses nonvolatile memory modules 361 but not nonvolatile memory modules 365 when cellular phone 30 is connected to computer 35. The data received from computer 350 and stored in nonvolatile memory module 365 can be utilized while cellular phone 30 is disconnected from computer 350.

Figure 4A:
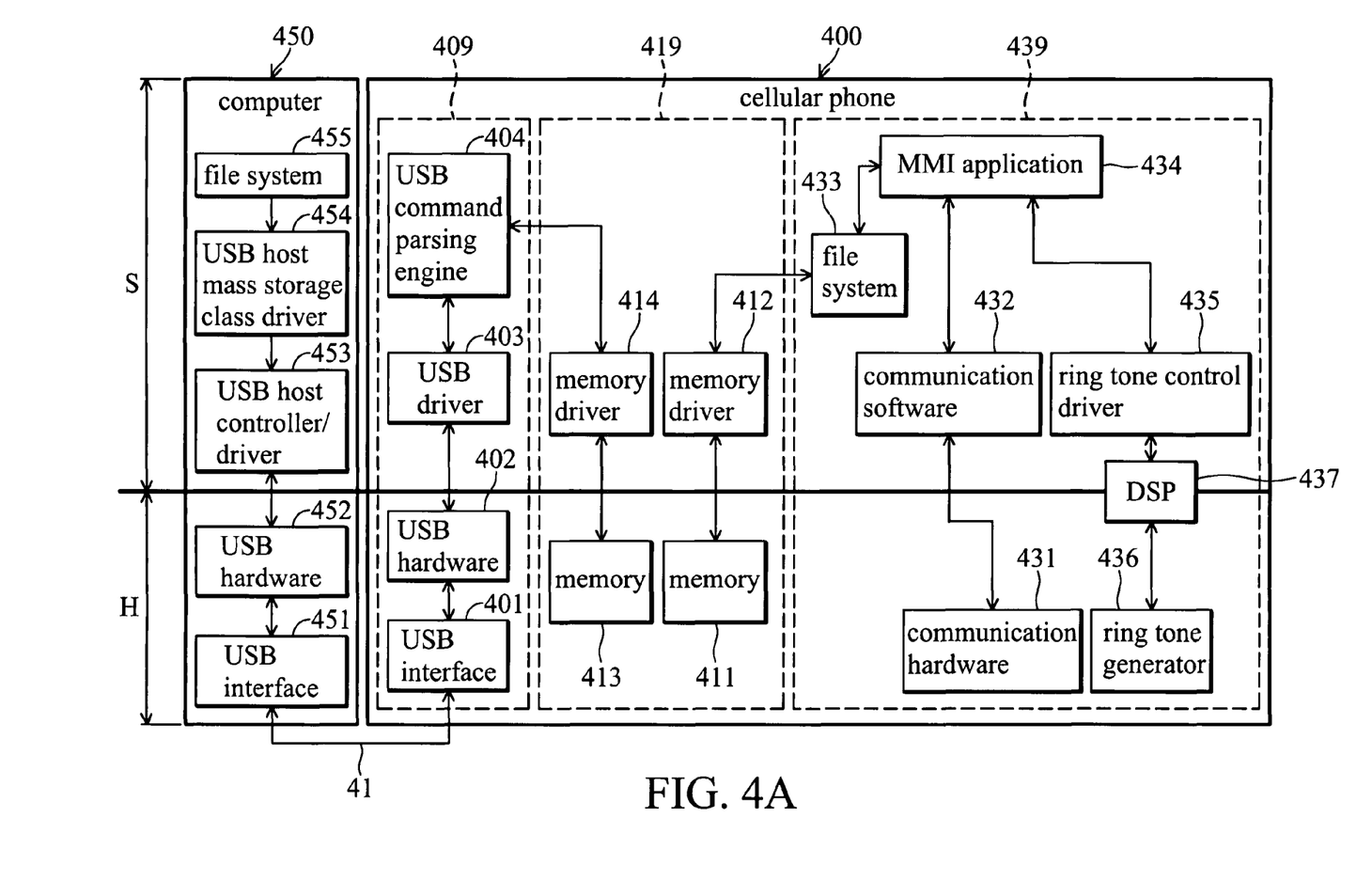
FIG. 4A illustrates operation of an embodiment of a cellular phone in a storage mode.

FIG. 4A illustrates operation of an embodiment of a cellular phone connected to a computer. A cellular phone 400 is connected to a computer 450 via a USB cable 41. The cellular phone 400 comprises a software component (S) and a hardware component (H) The computer 450 comprises a software component (S) and a hardware component (H). Each of the software components and hardware components comprises a plurality of operation units. The cellular phone 400 comprises a USB module 409, a memory module 419, and a communication module 439.

When cellular phone 400 is connected to a computer 450 via USB cable 41, USB interface 401, and USB hardware 402, an external interrupt is generated. USB driver 403 transmits a cable plug-in message for notifying phone file system 433 to close the access of nonvolatile memory 413. After a USB connection is established, access right of nonvolatile memory 413 has to be transferred to computer 450. Before transferring the access right, proper preparation must be done. For example, phone file system 433 closes a current access session to nonvolatile memory 413, flushes data in caches corresponding to nonvolatile memory 413, and finishes a current write operation to nonvolatile memory 413. Additionally, after the USB connection is established, a USB-device enumeration process is performed, and data transmission of mass storage class between nonvolatile memory 413 and the computer 450 is started. Data (such as sound, images, and MP3) can be transmitted to the cellular phone 400 via the USB cable 41 and stored in a non-volatile memory 413. When a command specifying data manipulation is received by the USB interface 401, the command is transmitted to a USB command parsing engine 404 via USB hardware 402 and a USB driver 403. The command is parsed in the USB command parsing engine 404 to determine whether data writing or retrieving is required. The parsed command is then transmitted to a memory driver 414, and data is input into and/or retrieved from the non-volatile memory 413 accordingly. When cellular phone 400 is connected to computer 450, data writing to and/or retrieving from non-volatile memory 413 is managed by a file system 455 provided by an operating system of a computer system 450 connected to the cellular phone 400 via the USB cable 41. Additionally, when the cellular phone 400 is connected to computer 450, a request made from an operation unit within the cellular phone 400 to access the second memory module is blocked.

When cellular phone 400 is connected to a computer 450, phone related functional units operate using data stored in nonvolatile memory 411. For example, when an incoming call is received, a ring tone is triggered to be emitted using the ring tone data stored in the nonvolatile memory 411.

Figure 4B:
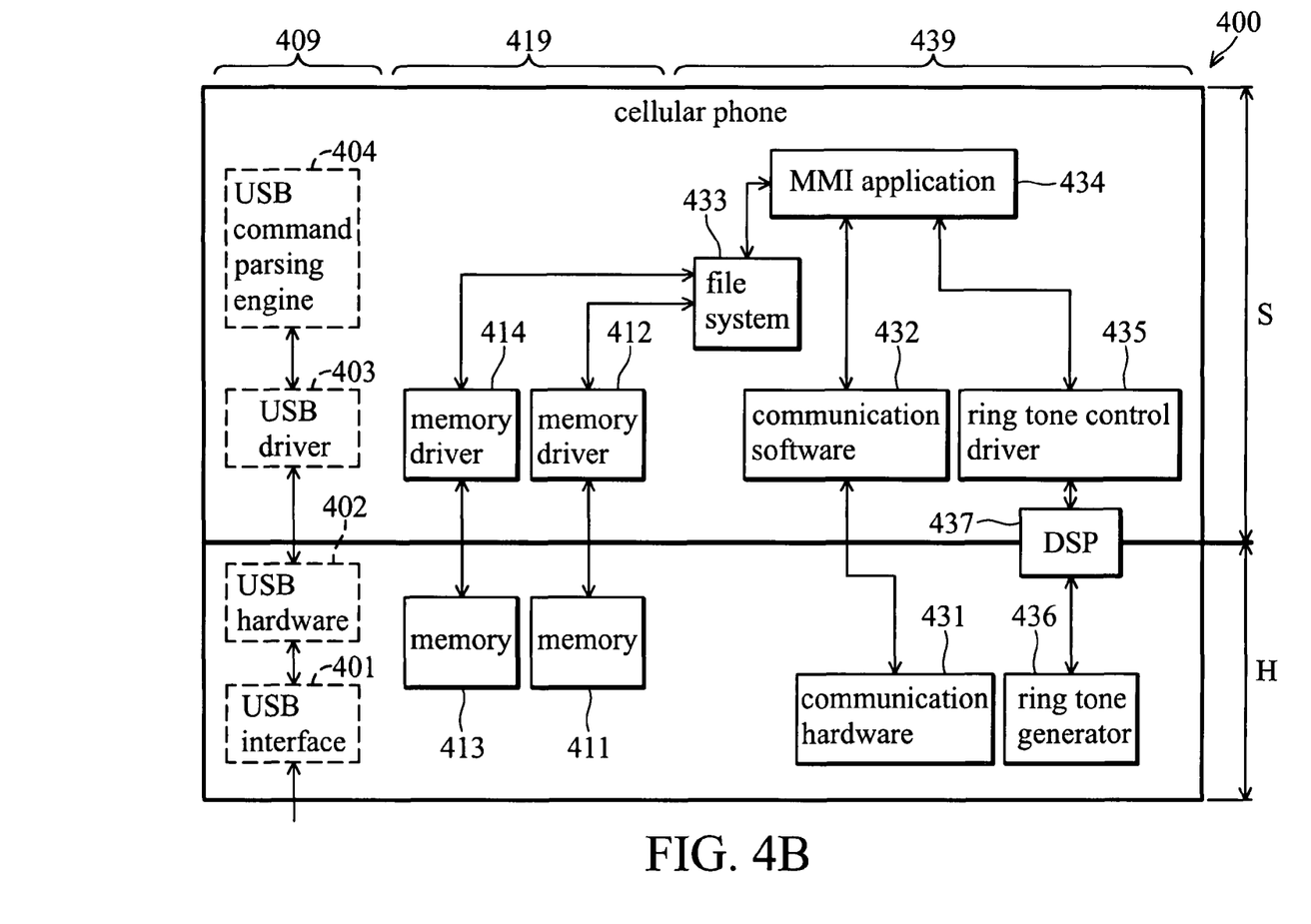
FIG. 4B illustrates operation of an embodiment of a cellular phone in a phone mode.

Using FIG. 4B as an example, when the cellular phone is disconnected from the external device, the access right of the memory 413 is granted exclusively to file system 433. Data stored in the nonvolatile memory 413 can be utilized via the memory driver 414 and file system 433 when the cellular phone 400 is disconnected from computer 450. Here, the functional units of cellular phone 400 used for USB connection are represented as dotted-line blocks, while the functional units of cellular phone 400 used for phone functionality are represented as solid-line blocks. Here, both the nonvolatile memory 411 and 413 and corresponding memory drivers 412 and 414 can be accessed and controlled by file system 433. For example, when an incoming call is received by communication hardware 431, and signals specified by the incoming call are transmitted to a MMI application 434 via communication software 432. The MMI application 434 directs a file system 433 to retrieve a ring tone file from the memory 413 via the memory driver 414. The retrieved ring tone file is then utilized by the ring tone control driver 435. The ring tone control driver 435 controls a ring tone generator 436 via a DSP 437. The ring tone generator 436 generates a ring tone according to the retrieved ring tone file. The data stored in the memory 413 can be sound data, image data, MP3 data, and/or other type of data. The data, received from computer 450 and stored in the memory 413, can be utilized when the cellular phone executes various communication-related and/or unrelated functions when disconnected from computer 450. For example, the data, received from computer 450 and stored in the memory 413, can be used to place telephone calls, access the Internet, send and receive emails, as well as operate as a personal digital assistant (or PDA) and/or MP3 player. Programs directing the described functionalities and data utilized thereby can be stored in an internal memory of the cellular phone. Additionally, the data received and stored in the memory 413 can be the aforementioned programs and/or data. Here, data specifying a ring tone file is used as an example, wherein a ring tone generated when receiving an incoming call is defined by the ring tone file. Here, the ring tone file is downloaded from a web site via the Internet, and stored in computer 450. The ring tone file is transmitted to the cellular phone 400 and stored in the memory 413 when the cellular phone 400 is connected to computer 450 via USB connection.

It should be noted that FIGS. 4A & 4B show the embodiment of two flash memories for implementing the memory module 36, and the two flash memories are the memories 411 and 413 to separately be the nonvolatile memory modules 361 and 365. As shown in FIGS. 4A and 4B, there are two corresponding memory drivers 412 and 414 for controlling the memories 411 and 413.

While the invention has been described by way of example and in terms of several embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A cellular phone, comprising:
   a connector for physically connecting the cellular phone to an external electronic apparatus;
   a first memory module for storing codes for performing operations on the cellular phone, and phone data, wherein the first memory module is not a SIM card, and wherein the codes are to be copied to a volatile memory for execution during power on;
   a second memory module for storing application data;
   a phone file system; and
   a controller determining whether the connector is connected to the external electronic apparatus, and
   if not, granting access right of both the first and second memory modules exclusively to the phone file system of the cellular phone,
   otherwise granting access right of the first memory module exclusively to the phone file system of the cellular phone and access right of the second memory module exclusively to the external device,
   wherein the first and second memory modules are two different memory modules controlled by two distinct memory drivers.

2. The cellular phone of claim 1, wherein the external electronic apparatus is a computer.

3. The cellular phone of claim 1, wherein the first memory module comprises a nonvolatile memory and a driver.

4. The cellular phone of claim 3, wherein the first memory module comprises a flash memory and a flash driver.

5. The cellular phone of claim 1, wherein the second memory module comprises a nonvolatile memory and a driver.

6. The cellular phone of claim 5, wherein the second memory module comprises a flash memory and a flash driver.

7. The cellular phone of claim 1, wherein the phone data comprises at least one of: phone book data, default ring tone data, and calibration data.

8. The cellular phone of claim 1, wherein the application data is multi-media data, comprising at least one of music file, movie file, and picture file.

9. The cellular phone of claim 1, wherein the controller further directs the phone file system to finish a write operation to the second memory module.

10. The cellular phone of claim 1, wherein the phone file system, when the connector connected to the external device, further blocks a request made from the cellular phone to access the second memory module.

11. The cellular phone of claim 1, wherein the controller, when detecting the connector connected to the external device, further performs a device enumeration process, and starts data transmission between the second memory module and the external device in a mass storage class.

12. The cellular phone of claim 1, wherein the second memory module is accessed by a device file system of the external device when the cellular phone connected to the external device.

13. The cellular phone of claim 1, wherein the controller, when the cellular phone not connected to the external device, receives an incoming call and triggers a ring tone to be emitted using the application data stored in the second memory module.

14. The cellular phone of claim 13, wherein the controller, when the cellular phone connected to the external device, triggers a ring tone to be emitted using a default setting specified by the phone data stored in the first memory module.

15. The cellular phone of claim 1, wherein the controller, after the cellular phone is disconnected from the external device, returns the access right of the second memory module to the cellular phone.

16. The cellular phone of claim 1, wherein the first memory module comprises a flash memory, and the second memory comprises another flash memory.

17. The cellular phone of claim 1, wherein the first memory module and the second memory module are included in a flash memory, and the first memory module comprises a first portion of banks of the flash memory, the second memory module comprises a second portion of banks of the flash memory.

18. The cellular phone of claim 1, wherein the volatile memory comprises a DRAM (Dynamic Random Access Memory) or a SRAM (Static Random Access Memory).

19. The cellular phone of claim 1, wherein the connector comprises one of the following: a USB (universal serial bus) connector, a UART (universal asynchronous receiver-transmitter) connector, an IEEE 1394 connector, a Bluetooth connector, an IrDA (Infrared Data Association) connector, a NFC (near field communication) connector, a WIFI, and a ZigBee connector.

20. A method of manipulating a cellular phone, wherein the cellular phone comprises a connector, a first memory module storing codes for performing operations on the cellular phone, and default ring tone data, wherein the codes are to be copied to a volatile memory for execution during power on, a second memory module, at least two distinct memory drivers controlling the two different first and second memory modules, and a phone file system, the method comprising:

granting access right of the first memory exclusively to the phone file system and access right of the second memory module exclusively to the external device when detecting the connector connected to an external device, wherein the external device has a device file system;

closing an access session to the second memory module via the phone file system when detecting the connector connected to an external device;

finishing a write operation to the second memory module via the phone file system when detecting the connector connected to an external device;

receiving an incoming call and triggering a ring tone to be emitted using a default setting to the default ring tone data of the first memory module when detecting the connector connected to an external device; and receiving an incoming call and triggering a signal to be emitted using the application data stored in the second memory module when detecting the connector disconnected from the external device.

21. The method of claim 20, further storing phone data in the first memory via the phone file system, wherein the phone data comprises at least one of: phone book data and calibration data.

22. The method of claim 20, further comprising flushing a cache corresponding to the second memory module via the phone file system.

23. The method of claim 20, further blocking a request made from the cellular phone to access the second memory module.

24. The method of claim 20, further performing a device enumeration process, and starts data transmission between the second memory module and the external device in a mass storage class.

25. The method of claim 20, further receiving application data from the external device and storing the application data to the second memory module via the external device file system.

26. The method of claim 25, wherein the application data is multi-media data, comprising at least one of music file, movie file, and picture file.

27. The method of claim 25, further detecting the USB (universal serial bus) connector disconnected from the external device and granting access right of both the first and second memory modules to the phone file system.

28. The method of claim 20, wherein the first memory module comprises a flash memory, and the second memory comprises another flash memory.

29. The method of claim 20, wherein the first memory module and the second memory module are included in a flash memory, and the first memory module comprises a first portion of banks of the flash memory, the second memory module comprises a second portion of banks of the flash memory.

30. The method of claim 20, wherein the volatile memory comprises a DRAM (Dynamic Random Access Memory) or a SRAM (Static Random Access Memory).

31. The method of claim 20, wherein the connector comprises one of the following: a USB (universal serial bus) connector, a UART (universal asynchronous receiver-transmitter) connector, an IEEE 1394 connector, a Bluetooth connector, an IrDA (Infrared Data Association) connector, a NFC (near field communication) connector, a WIFI, and a ZigBee connector.

32. The cellular phone of claim 1, wherein the controller directs the phone file system to close an access session to the second memory module, and flushing a cache corresponding to the second memory module when the connector is connected to the external electronic apparatus.

* * * * *